United States Patent [19]

Kurashige

[11] Patent Number: 5,646,697

[45] Date of Patent: Jul. 8, 1997

[54] SPECIAL EFFECTS VIDEO PROCESSOR

[75] Inventor: Masafumi Kurashige, Kanagawa, Japan

[73] Assignee: Sony Corporation, Tokyo, Japan

[21] Appl. No.: 372,957

[22] Filed: Jan. 17, 1995

[30] Foreign Application Priority Data

Jan. 19, 1994 [JP] Japan .................. 6-004098

[51] Int. Cl.⁶ .................................. H04N 7/01
[52] U.S. Cl. .................. 348/459; 348/452; 348/578
[58] Field of Search ........................... 348/578, 581, 348/583, 571, 575, 448, 452, 441; H04N 9/74, 7/01

[56] References Cited

U.S. PATENT DOCUMENTS

| | | | |
|---|---|---|---|
| 4,888,643 | 12/1989 | Kusakabe | 348/578 |
| 4,956,707 | 9/1990 | Oakley et al. | 348/441 |
| 5,225,824 | 7/1993 | Yammoto et al. | 348/578 |
| 5,469,223 | 11/1995 | Kimura | 348/448 |

FOREIGN PATENT DOCUMENTS

2-285786  11/1990  Japan .

Primary Examiner—Michael H. Lee
Attorney, Agent, or Firm—William S. Frommer; Alvin Sinderbrand

[57] ABSTRACT

In a special effects video processor, a low-pass filter limits, in a horizontal direction, the bandwidth of an input video signal. A field/frame converter, receiving the video signal from the first low-pass filter, generates a frame signal which is comprised of a video signal for one frame by generating one odd or even field signal from the other said odd or even field signal. A low-pass filter limits in a vertical direction the bandwidth of such frame signal supplied from the field/frame converter. In a mapping processor, a memory stores the frame signal supplied from the second low-pass filter, and an interpolator performs interpolation for a plurality of data in the frame signal read from the memory. Such special effects video processor provides a processed video image without deterioration in quality.

2 Claims, 7 Drawing Sheets

SPECIAL EFFECTS VIDEO PROCESSOR

FIELD OF THE INVENTION

The present invention relates to a special effects video processor for producing special effects such as the magnification, reduction, shift or modification of video images.

BACKGROUND OF THE INVENTION

Figure 1:
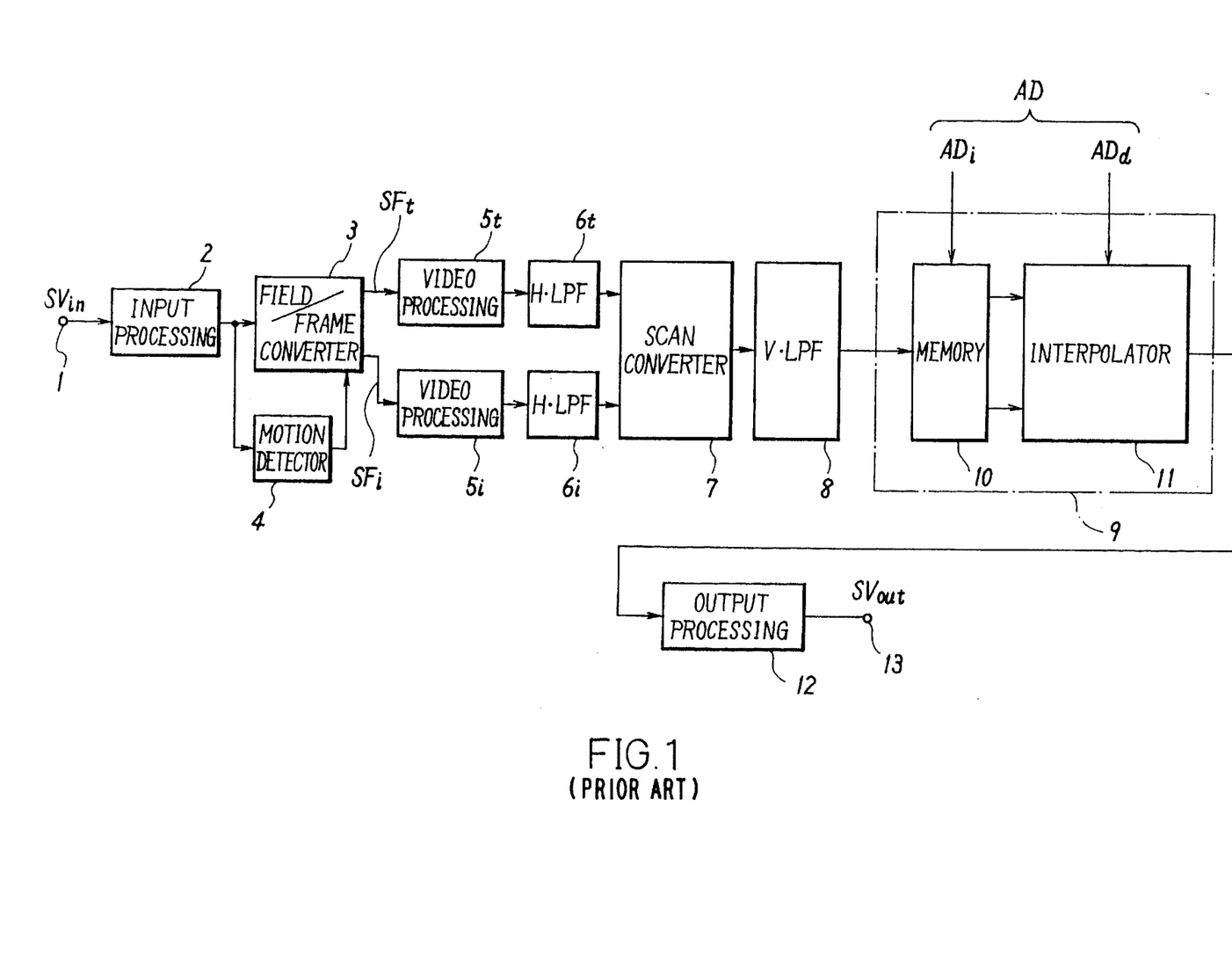
FIG. 1 is a block diagram of a special effects video processor previously proposed.

FIG. 1 illustrates a special effects video processor previously proposed, wherein a digital video signal SVin is supplied through an input terminal 1 to an input processor 2 which produces a "freezing" effect causing a motion in the video image to pause intermittently for several seconds by inhibiting data from being written in a buffer memory. The video signal processed by the input processor 2 is supplied to a field/frame converter 3 and a motion detector 4. The motion detector 4 determines the amount of image movement, for instance, by comparing pixel data for several frames. Such motion determination signal for each frame is supplied as a control signal to the converter 3. The converter 3 converts the signal for each field into a frame signal which is comprised of the signals for a single frame. In other words, the converter 3 provides a field signal which consists of a field signal from the input processor 2 (referred to below as "true field signal") and a field signal for another field other than true field (referred to below as "interpolated field signal"). Pixel data which constitute such interpolated field signal are generated from the pixel data from that field and from the previous field, based on the motion determination signal.

The true field signal SFt and the interpolated field signal SFi are supplied to the video processors 5t and 5i, respectively, which produce a mosaic effect for modifying a video image into a mosaic image or a color-correcting effect for changing the color of a video image. The true field signal and the interpolated field signal, processed in the video processors 5t and 5i, are supplied through low-pass filters 6t and 6i to a scan converter 7. The low-pass filters 6t and 6i prevent "aliasing" in the output video signal when shrinking the video image. As the scan converter 7 has memory, it can set in its memory a direction for writing which is different from the direction for reading, thereby converting the horizontal order of the pixel data into a vertical order. Each of the true field signal and the interpolated field signal, in which the order of the pixel data has been converted by the scan converter 7, is supplied to a vertical low-pass filter 8. The low-pass filter 8 performs a filtering process along the vertical direction before such conversion of the order of the pixel data by the scan converter 7, or in other words, in the horizontal direction after the conversion by the scan converter 7. In a fashion similar to the low-pass filters 6t and 6i, the vertical low-pass filter 8 prevents "aliasing" in the output video signal when shrinking the video image. The vertical low-pass filter 8 performs the filtering process, using the true field signal and the interpolated field signal simultaneously. In order to have the field signal, for which the order of the pixel data has been converted, supplied to the vertical low pass filter 8, the low-pass filter 8 may be constructed to use delay elements which have a delay period of one clock, corresponding to each of the pixel datum.

The true field signal and the interpolated field signal processed in the low-pass filter 8 are successively supplied and stored into a memory 10 in a mapping processor 9 which produces effects such as magnification, reduction, shift and modification of the video images. The memory 10, receiving an integral portion ADi of an address AD generated in an address generator (not shown), reads and supplies a plurality of pixel data, for example, 8×8 (length by side)=64 pixel data simultaneously to an interpolator 11 in accordance with such integral portion ADi. The interpolator 11, receiving a decimal portion ADd of the address AD, synthesizes one item of pixel datum in accordance with the address AD by weighting a plurality of pixel data supplied from the memory 10. In other words, in such mapping process, the pixel data, which are needed for generating an output video image, are successively supplied for the production of an effect such as magnification, reduction, shift or modification of video images. Such pixel data in the input video image do not always include enough pixel data necessary for the generation of the output video image. The mapping processor 9 reads pixel data near the necessary data simultaneously and synthesizes the pixel data by weighting the pixel data, using the interpolator 11. The video signal provided from the interpolator 11 in the mapping processor 9 is supplied to an output processor 12, which produces a recursive effect for synthesizing an after-image overlaid on a moving object, and a background effect for replacing a non-essential background portion of the video image with another image. The video signal processed by the output processor 12 is supplied as an output video signal Vout to the output terminal 13. Its scanning direction is returned to that of the input video signal Vin by controlling of the address when writing the pixel data into the memory 10.

Figure 2:
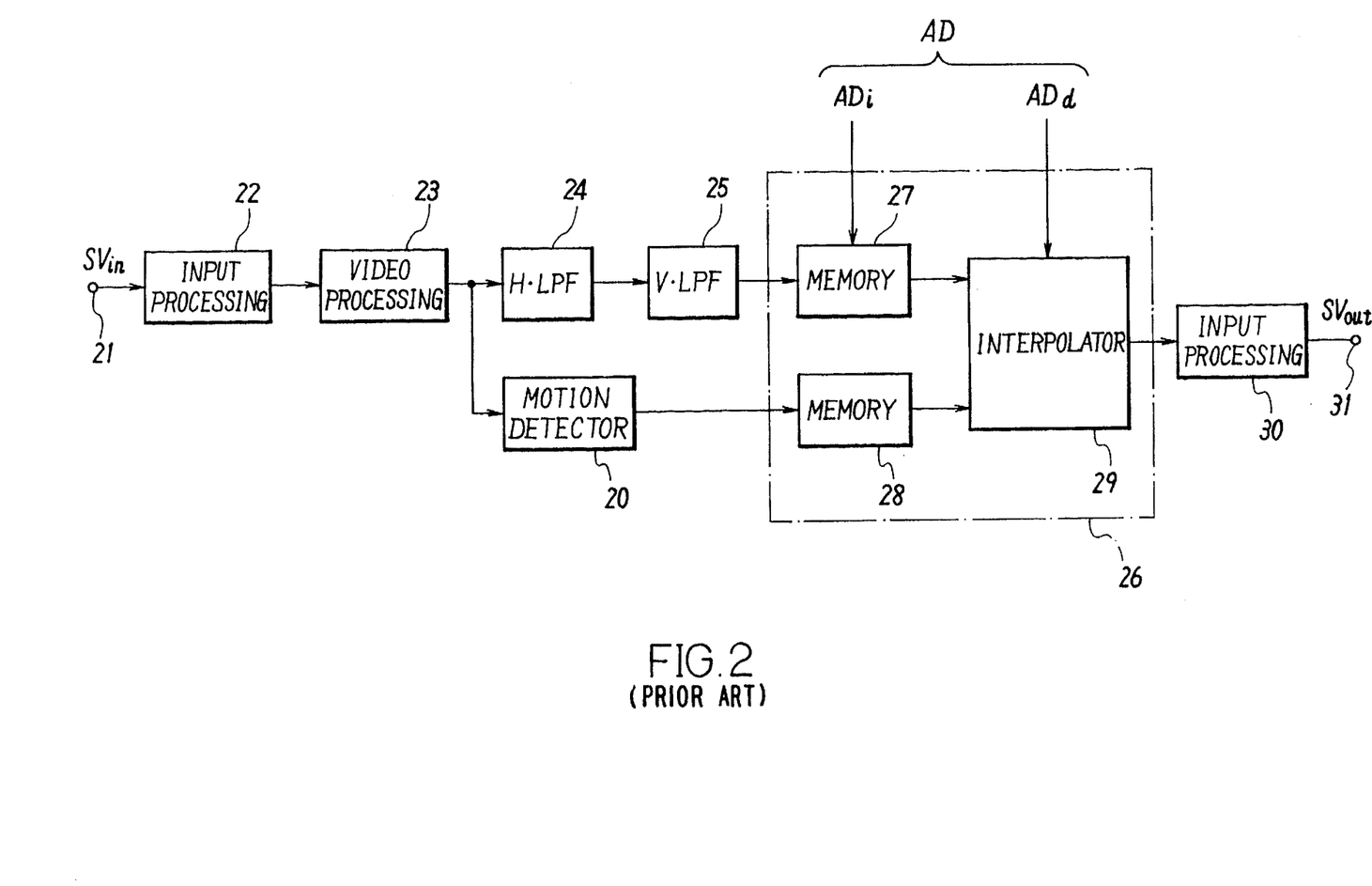
FIG. 2 is a block diagram of another special effects video processor previously proposed.

FIG. 2 illustrates another special effects video processor previously proposed, where an interlacing digital video signal SVin is supplied through an input terminal 21 to an input processor 22, which produces a "freezing" effect by causing the video image to pause intermittently for several seconds by inhibiting data from being written into a buffer memory. The video signal processed by the input processor 22 is supplied to a video processor 23, which produces mosaic or color-correcting effects. The video signal processed by the video processor 23 is successively supplied and stored in a memory 27 in a mapping processor 26 through the horizontal and vertical low-pass filters 24 and 25 then to the memory 27 which is a part of the mapping processor 26, and is stored in that memory. The low-pass filter 25 uses a delay element having a delay time equivalent to a horizontal period, for example, a line memory. The low-pass filters 24 and 25 prevent "aliasing" in the output video signal when shrinking the video image. A mapping processor 9 produces effects such as magnification, reduction, shift and modification of the video image. The video signal processed by the video processor 25 is supplied to a motion detector 20, which determines the amount of image movement, for instance, by comparing pixel data for several frames. A motion determination signal for each frame generated by the motion detector 20 is successively supplied to and stored in a memory 28 in the mapping processor 26.

The memory 27, receiving an integral portion ADi of an address AD generated in an address generator (not shown), reads and supplies a plurality of pixel data, for example, 8×8 (length by side)=64 pixel data (signals of the current field and the prior field) simultaneously to an interpolator 29 in accordance with such integral portion ADi. The interpolator 29, receiving a decimal portion ADd of the address AD, synthesizes one item of pixel datum in accordance with the address AD by weighting a plurality of pixel data supplied from the memory 27. The interpolator 29 synthesizes the pixel data from the signals of the current or prior field based on the motion determination signal. The video signal provided from the interpolator 29 in the mapping processor 26 is supplied to an output processor 50, which produces a recursive effect, a background effect, and so on. The video signal processed by the output processor 30 is supplied as the output video signal Vout to an output terminal 31.

Figure 3:
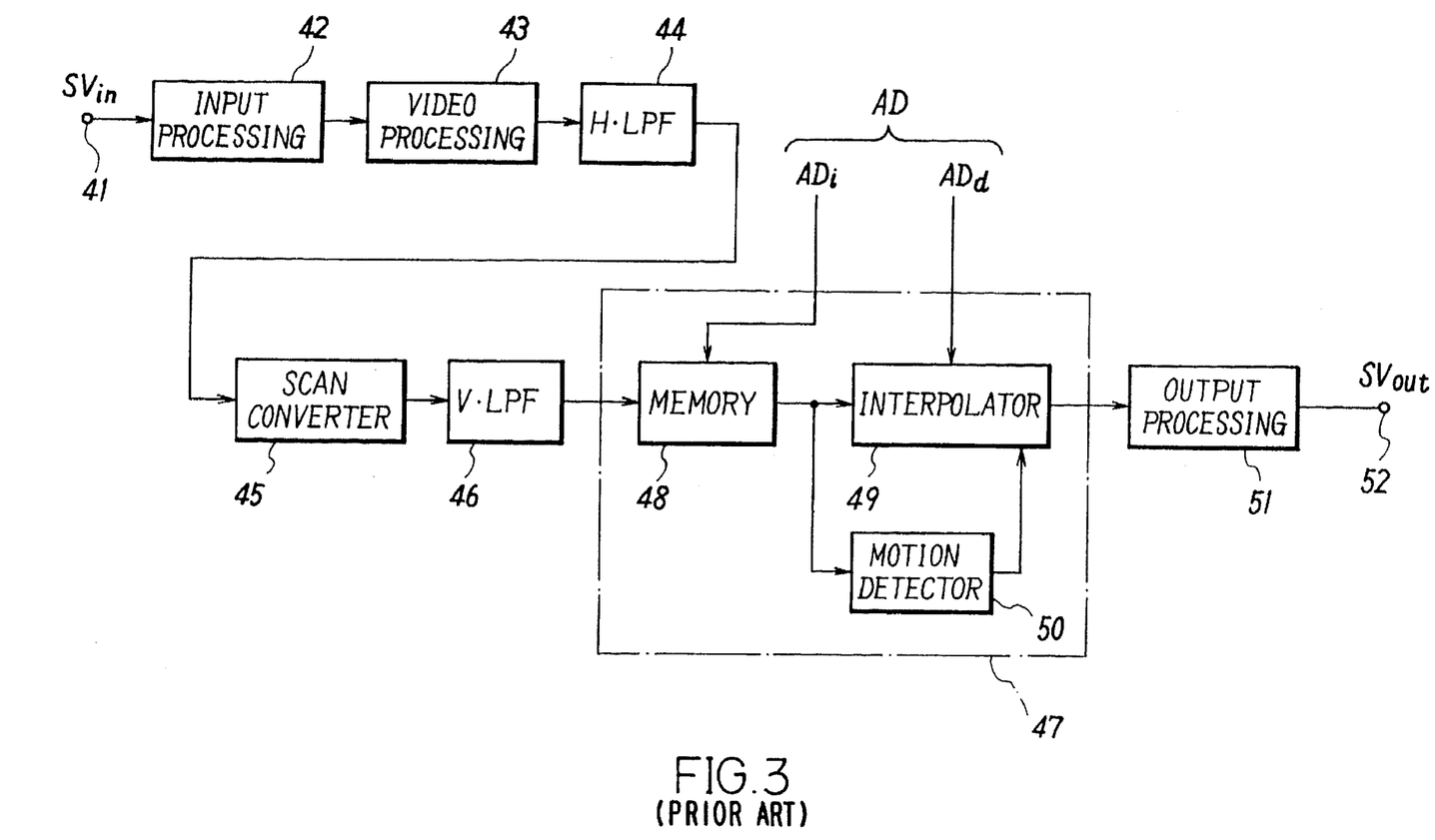
FIG. 3 is a block diagram of still another special effects video processor previously proposed.

FIG. 3 illustrates still another special effects video processor which was previously proposed, where an interlacing video signal SVin is supplied from an input terminal 21 to an input processor 42, which produces a "freezing" and other effects. The video signal processed by the input processor 42 is supplied to a video processor 43, which produces mosaic or color-correcting effects. The video signals, processed in the video processor 43, are supplied through a horizontal low-pass filter 44 to a scan converter 45. The low-pass filter 44 prevents "aliasing" in the output video signal when shrinking the video image. The scan converter 45 has a memory that sets the direction for writing which is different from the direction for reading, thereby converting the horizontal order of the pixel data into the vertical order. The video signal of the pixel data, ordered as converted by the scan converter 47, is supplied to a vertical low-pass filter 46, which prevents "aliasing" in the output video signal when shrinking the video image. This is similar to the function of the low-pass filter 44. In order to have the field signal, for which the order of the pixel data has been converted, supplied to the vertical low pass filter 46, the low-pass filter 46 may be constructed to use delay elements which have a delay period of one clock, corresponding to each of the pixel datum.

The video signals, processed in the low-pass filter 46, are successively supplied to and stored in a memory 48 in the mapping processor 9 which produces effects such as magnification, reduction, shift and modification of the video image. The memory 48, receiving an integral portion ADi of an address AD generated in an address generator (not shown), reads and supplies a plurality of pixel data, for example, 8×8 (length by side)=64 pixel data (signals of the current field and the field before) simultaneously to an interpolator 49 in accordance with such integral portion ADi. The interpolator 49, receiving a decimal portion ADd of the address AD, synthesizes one item of pixel datum in accordance with the address AD by weighting a plurality of pixel data supplied from the memory 48. The pixel data, read from the memory 48 in accordance with such integral portion ADi, are supplied to a motion detector 50, which determines the amount of image movement by comparing pixel data for several frames. The motion determination signal from the motion detector 50 is supplied to the interpolator 49, which synthesizes the pixel data from the signals of the current or prior field, based on the motion determination signal. The video signal provided from the interpolator 49, located in the mapping processor 47, is supplied to an output processor 51, which produces a recursive effect, a background effect, and so on. The video signal processed by the output processor 51 is supplied as the output video signal Vout to the output terminal 52.

In the special effects video processor shown in FIG. 1, the field/frame converter 3 is near the input terminal 1, in other words, next to the input processor 2. It is accordingly possible to provide a video image containing specific video effects having limited deterioration in image quality because of the conversion of the field/frame of the field signal which occurs before "noise" is produced by various signal processing. In addition, it is also possible to provide a higher quality of a video image with specific video effects by filtering a frame signal than by filtering a field signal. However, since the field/frame converter 3 is next to the input processor 2, obviously from the video processors 5t and 5i, the special effects video processor has a disadvantage in that the scale of its circuitry is doubled.

The special effects video processor shown in FIG. 2 has the vertical low-pass filter 25 filtering the field signal, which causes a video image to deteriorate more than with the filtering process for the frame signal. This can be easily understood by considering that the pitch for each line of the field is like a stripe that is separated from the next stripe by an equal distance. Further, in the example of FIG. 2, a line memory is required for the low-pass filter 25. Moreover, in the example of FIG. 2, a movement determination is made from the output of the video processing circuit 22, but before correction of the movement can be made based on the result of this determination, the field signal is filtered by the horizontal low-pass filter 24 and the vertical low-pass filter 25. Therefore, problems arise in that the processing performed at the interpolator 29 to correct for movement is not performed well.

The special effects video processor shown in FIG. 3, like that in FIG. 2, has the vertical low-pass filter 25 filtering the field signal, which also causes a video image to deteriorated more than that with the filtering process for the frame signal. In addition, the image movement must be determined in accordance with the pixel data read at random from the memory 48 for interpolation, and in such determination process, it is impossible to cover a wide scope of pixel data.

OBJECTS AND SUMMARY OF THE INVENTION

It is accordingly an object of the invention to provide an improved special effects video processor to solve the above-mentioned problems, and in particular, a special effects video processor which provides a processed video image in quality equal to the special effects video processor shown in FIG. 1 but with a smaller scale of circuitry than such special effects video processor.

In one aspect of the present invention, a special effects video processor according to the present invention, is comprised of a horizontal low-pass filter, a field/frame converter, a vertical low-pass filter, and a mapping processor. The low-pass filter limits the bandwidth of an input video signal which is comprised of odd and even field signals in a horizontal direction. The field/frame converter generates a frame signal which is comprised of a video signal for one frame by synthesizing one odd or even field signal from the other said odd or even field signal. The low-pass filter limits the bandwidth of the frame signal from the field/frame converter in a vertical direction. The mapping processor has a memory for temporarily storing the frame signal supplied from the second low-pass filter, and an interpolator for performing interpolation in accordance with address data for a plurality of data in the frame signal read from the memory.

In another aspect of the present invention, the special effects video processor is further comprised of a scan converter means, between the first low-pass filtering means and the field/frame converter, for converting a horizontal scanning direction of the field signal into a vertical scanning direction.

In still another aspect of the present invention, the special effects video processor is further comprised of a motion detector which determines image movement in the video signal, based on the output from the scan converter. In addition, the field/frame converter synthesizes the frame signal based on a determination by the motion detecting means.

In yet another aspect of the present invention, the special effects video processor is further comprised of a second interpolator which generates an interpolation signal for the frame signal supplied from the second low-pass filter in a direction in accordance with the vertical direction of the input video signal.

Additional objects and advantages of the present invention will be apparent from the following detailed description of a preferred embodiment thereof which is best understood with reference to the accompanying drawings.

DETAILED DESCRIPTION OF THE PREFERRED EMBODIMENT

Figure 4:
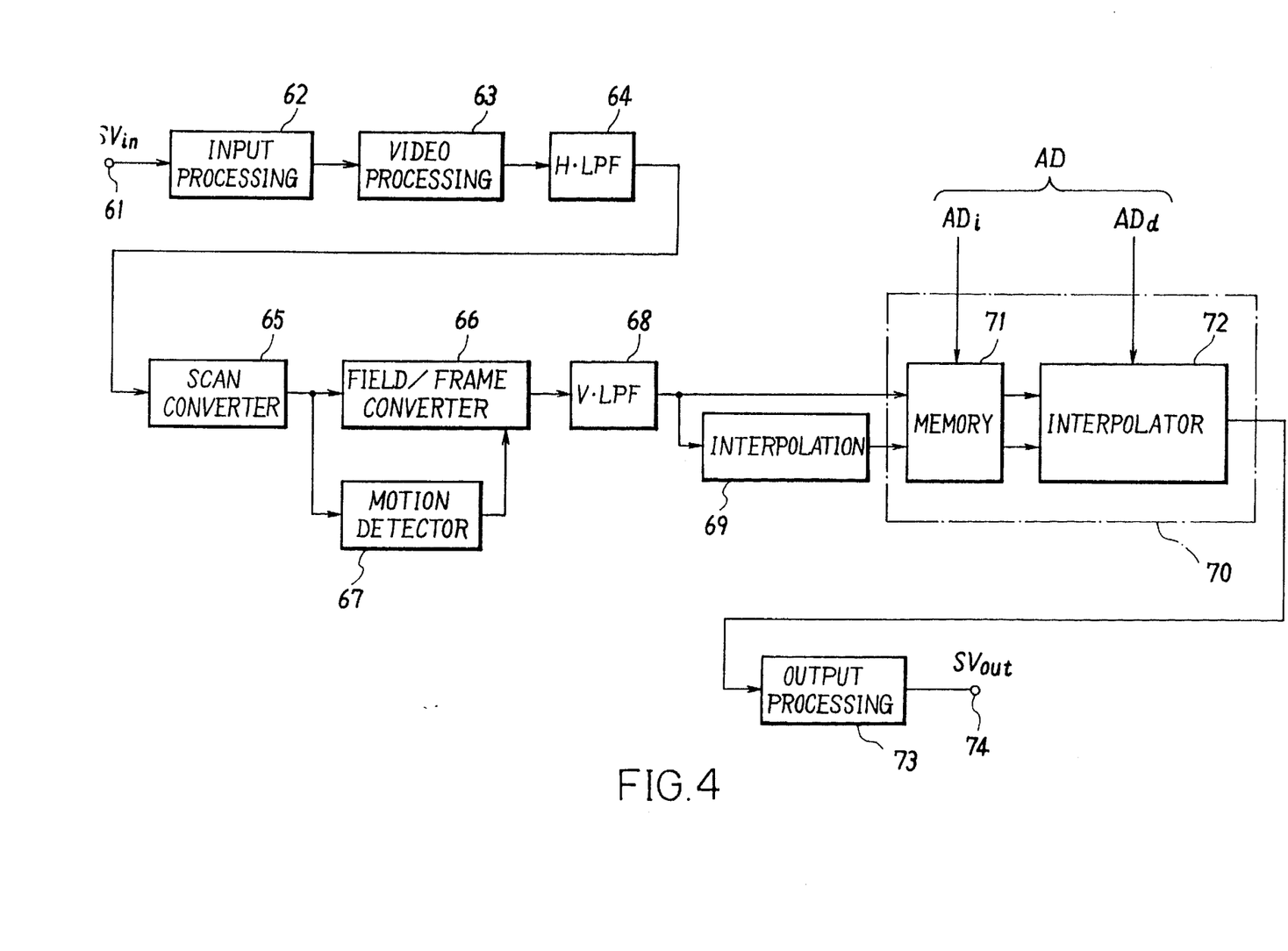
FIG. 4 is a block diagram of a special effects video processor according to the present invention.

A preferred embodiment according to the present invention is described below with reference to FIG. 4. In FIG. 4, a digital interlacing video signal SVin is supplied from an input terminal 61 to an input processor 62, which produces a "freezing" effect. The video signal processed in the input processor 62 is supplied to a video processor 63, which produces mosaic effects, color-correcting effects and so on. The video signal processed by the video processor 63 is supplied through a horizontal low-pass filter 64 to a scan converter 65. The low-pass filter 65 prevents "aliasing" when reducing the video image. The scan converter 7 having a memory sets in its memory a direction for writing which is different from a direction for reading in its memory, thereby converting the horizontal direction in the pixel data order into the vertical direction. The true field signal, the order of the pixel data for which was converted by the scan converter 65, is supplied to a field/frame converter 66 and a motion detector 67. The motion detector 67 determines an amount of image movement, for instance, by comparing pixel data for two neighboring frames and generates a motion determination signal, which is supplied as a control signal to the converter 66, of which an embodiment is disclosed in Japanese Patent Application Un-examined Publication No. 285786/1990.

Figure 5:
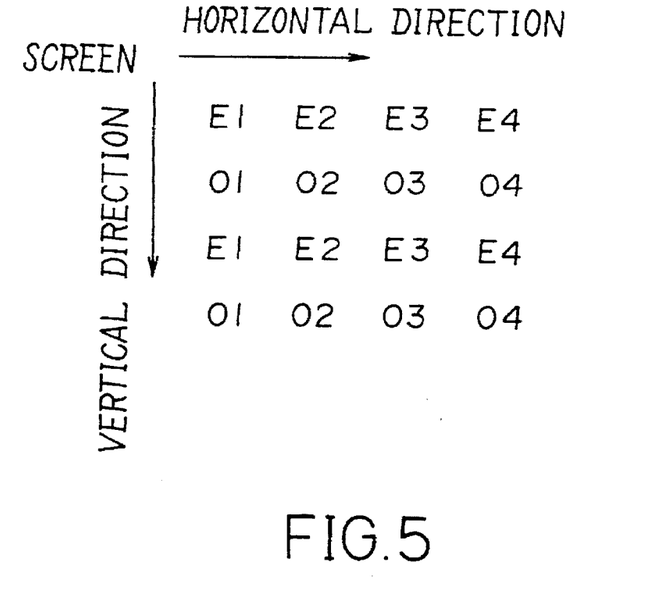
FIG. 5 illustrates pixel data supplied from the scan converter 65.
Figure 6:
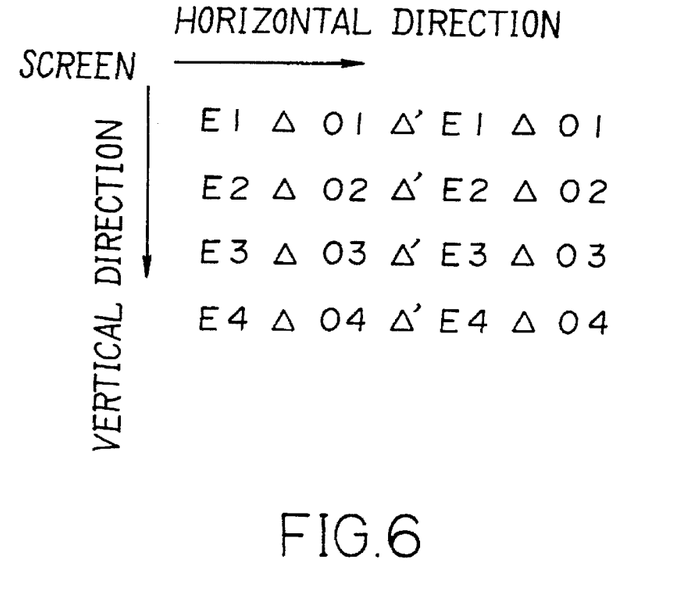
FIG. 6 illustrates pixel data stored in a memory 71.

The field/frame converter 66 converts the signal for each field into a combination of signals which is comprised of signals for one frame. In other words, the converter 66 provides a field signal which consists of a field signal from the scan converter 65 (referred to below as "true field signal") and a field signal for another field other than the true field (referred to below as "interpolated field signal"). Pixel data which constitute the interpolated field signal are generated from the pixel data in the same field or, for instance, in the previous field, based on the motion determination signal. For instance, as shown in FIG. 5, the input video signal is comprised of an even field signal which consists of pixel data E1 to E4 and an odd field signal which consists of pixel data O1 to O4. The even field signal is converted into pixel data E1 to E4 in FIG. 6 and the odd field signal is converted into pixel data O1 to O4 by the scan converter 65. The field/frame converter 66 synthesizes pixel data O1 to O4 when the input video signal is the odd field signal, and synthesizes pixel data E1 to E4 when the input video signal is the even field signal. Such field/frame converter 66, synthesizing a frame signal from the field signal for which the scanning direction is converted, is simple and inexpensive comprised of a delay element and needing no line memory. An interpolator 69 synthesizes pixel data $\Delta$ and $\Delta'$ by linear interpolating from two points after and before. Like the field/frame converter 66, such interpolator 69 is simple and inexpensive comprised of a delay element such as a latch circuit and needing no line memory. The pixel data shown in FIG. 6 are stored in a memory 71.

The memory 71, receiving an integral portion ADi of an address AD generated in an address generator (not shown), reads and supplies two pixel data to an interpolator 72 in accordance with such integral portion ADi. The interpolator 72, receiving a decimal portion ADd of the address AD, generates one item of pixel datum in accordance with the address AD by weighting the two pixel data supplied from the memory 10. The video signal provided from the interpolator 72 in the mapping processor 70 is supplied to an output processor 73, which produces a recursive effect, a background effect, and so on. The video signal processed by the output processor 73 is supplied as an output video signal Vout to an output terminal 74.

Figure 7A:
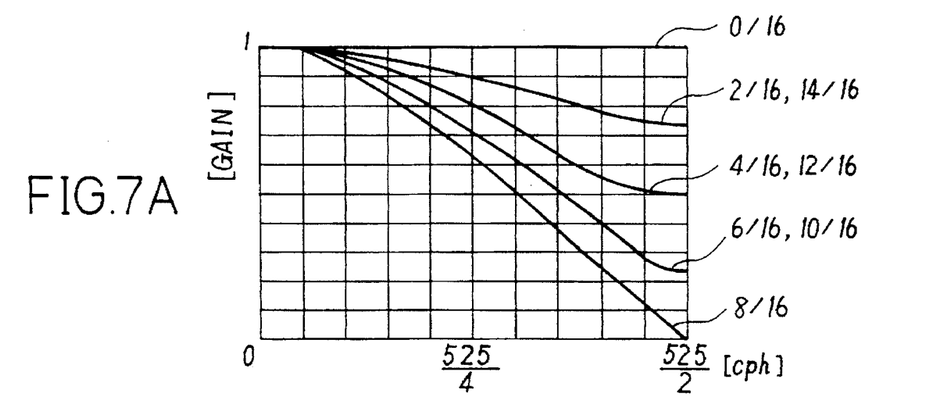
FIG. 7A illustrates the gain frequency characteristic of pixel data after linear interpolation using two points of pixel data.
Figure 7B:
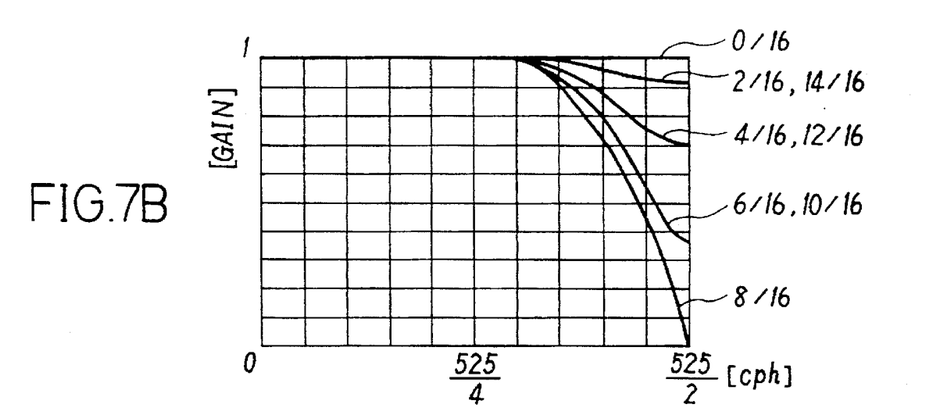
FIG. 7B illustrates the frequency characteristic in interpolation using eight pixel data in the vertical direction.
Figure 7C:
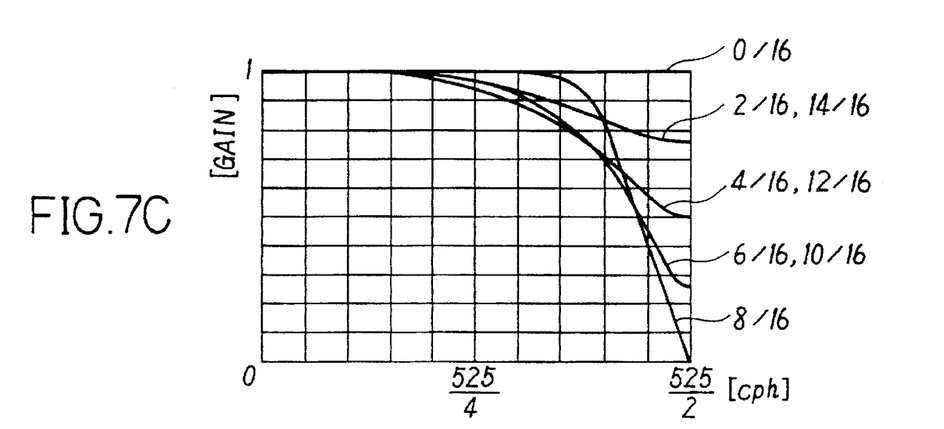
FIG. 7C illustrates frequency characteristic in linear interpolation for two points after obtaining their middle points for eight pixel data.
Figure 8:
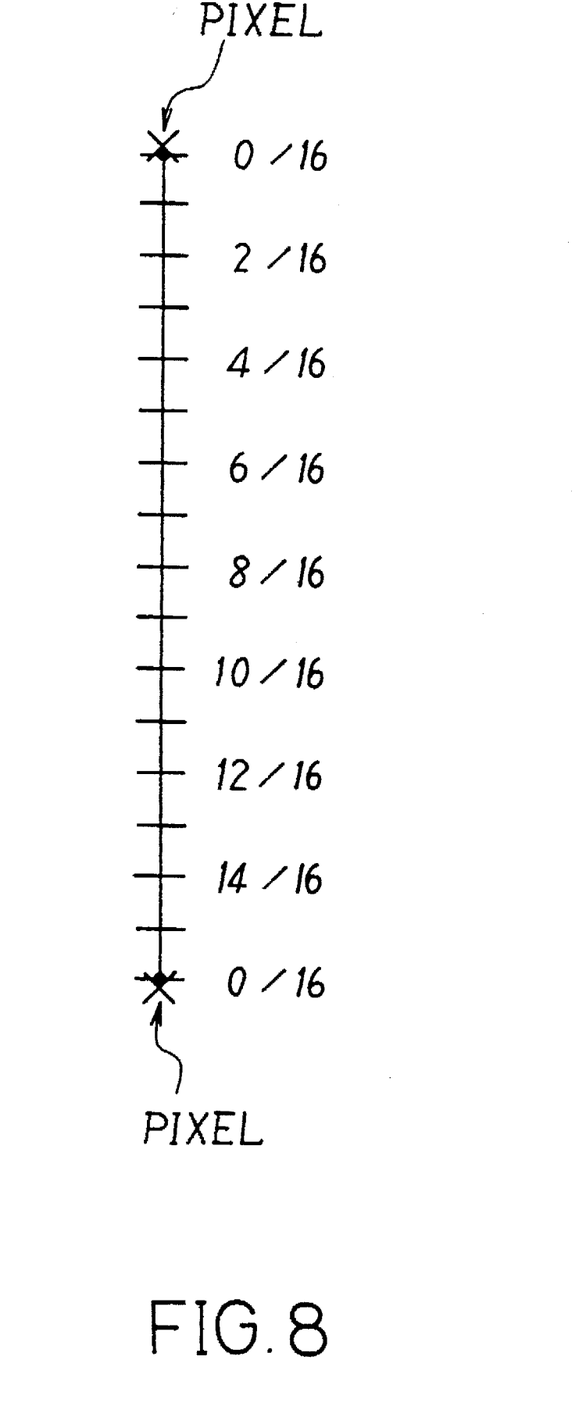
FIG. 8 illustrates the relative position of two neighboring points of pixel data and pixel data given by interpolation.

Referring to FIG. 7A to 7C, frequency characteristics in interpolation are described below. FIG. 7A illustrates frequency characteristic in linear interpolation using two points of pixel data in the vertical direction of the input video signal. In other words, there is a gain frequency characteristic of the pixel data after linear interpolation using two points of pixel data. In FIG. 7A, the point given by linear interpolation for two neighboring pixel data is a parameter, the vertical axis is the gain when the level of the input pixel data is set to 1, and the horizontal axis is the frequency (cycle per height) of a video image in the vertical direction of a display in which scanning lines are set to 252 lines. FIG. 7B illustrates interpolation using eight pixel data in the vertical direction. FIG. 7C illustrates the frequency characteristic in linear interpolation for two points after obtaining their middle points for eight pixel data, according to the present invention. As shown in FIG. 7C, it is possible, in linear interpolation by the interpolator 72 using two points, to gain the frequency characteristic equal to interpolation using eight points of pixel data in FIG. 7B. The interpolation as shown in FIG. 7B causes an increase in the number of the memory. In addition, FIG. 8 illustrates the relative position of two neighboring points of pixel data and pixel data given by interpolation.

It will be obvious to those having skill in the art that many changes may be made in the above-described details of the preferred embodiment of the present invention. The scope of the present invention, therefore, should be determined by the following claims.

What is claimed is:

1. A video special effect apparatus comprising:

first low-pass filtering means for band-limiting, in a horizontal direction, the bandwidth of an input video signal of a video picture comprised of an odd field signal of odd field pixels and an even field signal of even field pixels;

field/frame converting means for converting the band-limited odd and even field signals band limited by said first low-pass filtering means into a frame signal for one video frame by combining an odd field pixel or an even field pixel with at least a pixel of the odd or even field signals;

second low-pass filtering means for band-limiting, in a direction corresponding to a vertical direction of said input video signal, the bandwidth of said frame signal generated by said field/frame converting means;

mapping processing means having memory means for temporarily storing said frame signal generated by said second low-pass filtering means;

first interpolating means for interpolating data in said frame signal stored in said memory means;

scan converter means coupled between said first low-pass filtering means and said field/frame converting means for reading the band-limited signal from said first low-pass filtering means in a horizontal scanning direction and writing the band-limited signal to said field/frame converting means in a vertical direction; and second interpolating means for interpolating in a direction corresponding to the vertical direction of said input video signal, the band-limited signal generated by said second low-pass filtering means.

2. The video special effect apparatus according to claim 1, further comprising motion detecting means for determining an amount of image movement in said video picture by comparing pixels in the scan-converted signal generated by said scan converter means, and wherein said field/frame converting means generates said frame signal from said field signal based on said amount of image movement.

* * * * *